United States Patent [19]
Johnson

[11] 3,792,231
[45] Feb. 12, 1974

[54] MINIATURE MULTISTATION PHOTOMETER ROTOR TEMPERATURE CONTROL

[75] Inventor: Wayne F. Johnson, Loudon, Tenn.

[73] Assignee: The United States of America as represented by the United States Atomic Energy Commission, Washington, D.C.

[22] Filed: Jan. 11, 1973

[21] Appl. No.: 322,645

[52] U.S. Cl. ............... 219/497, 219/505, 219/506
[51] Int. Cl. .......................................... H05b 1/02
[58] Field of Search ... 219/494, 497, 499, 501, 505, 219/506

[56] References Cited
UNITED STATES PATENTS 3,256,734    6/1966   Storke ........................... 219/497 X
3,371,191    2/1968   Seney ............................ 219/497 X
3,474,258   10/1969   Nagy ............................. 219/497 X
3,665,159    5/1972   Becker et al. ................... 219/497 X
3,725,685    4/1973   Bourgoin et al. ................ 219/497 X Primary Examiner—Bernard A. Gilheany
Assistant Examiner—F. E. Bell
Attorney, Agent, or Firm—John A. Horan

[57] ABSTRACT

A rotor temperature monitoring and control circuit for a Miniature Fast Analyzer is provided. Radiant heat from a heat lamp is directed onto the rotor and, by means of a thermistor positioned in the rotor, closed-loop control of the rotor temperature is achieved. Temperatures within ±0.2 degree centigrade can be maintained at the cuvettes of the rotor.

3 Claims, 1 Drawing Figure

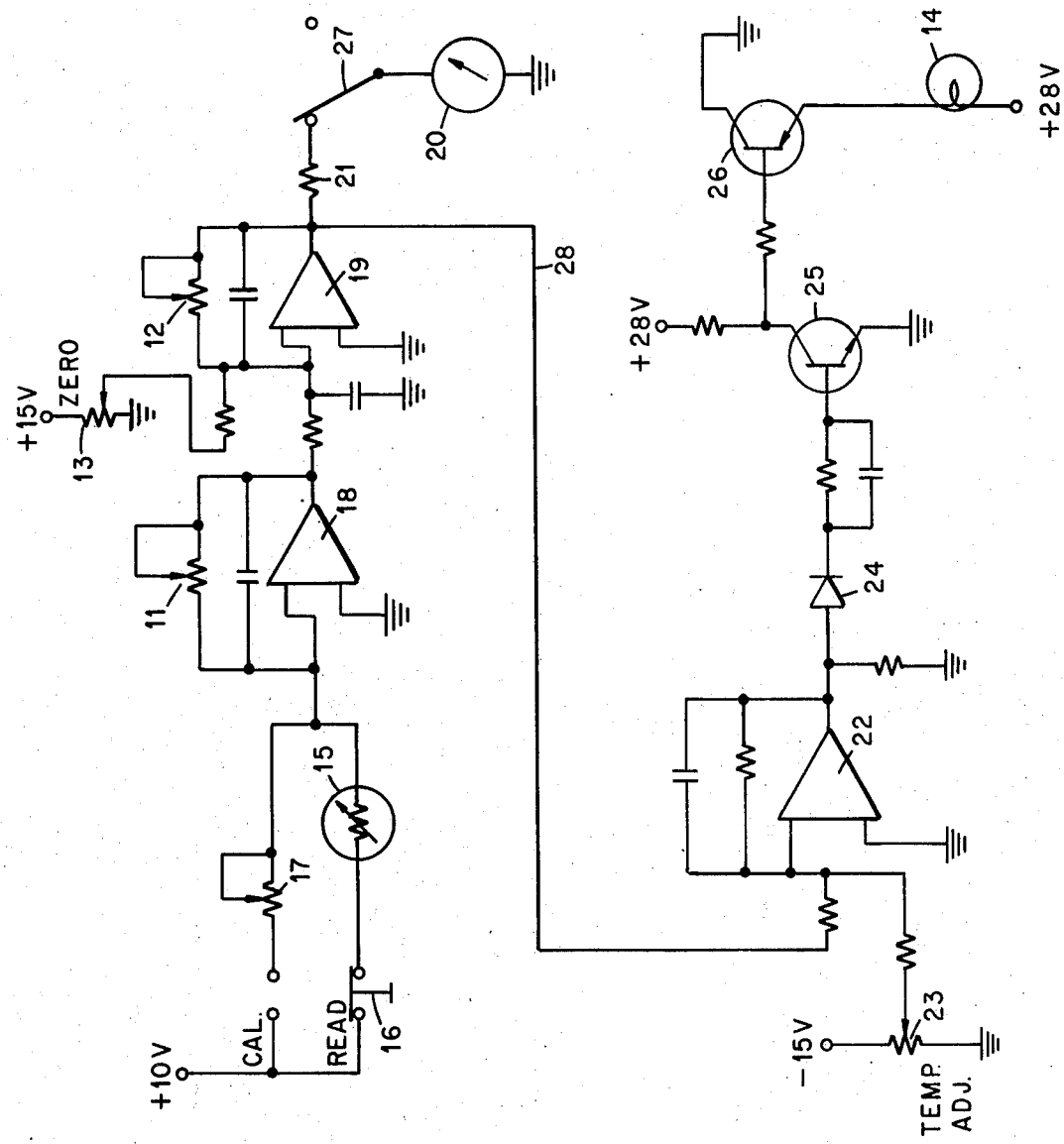

MINIATURE MULTISTATION PHOTOMETER ROTOR TEMPERATURE CONTROL

BACKGROUND OF THE INVENTION

This invention was made in the course of, or under, a contract with the United States Atomic Energy Commission.

A compact analytical photometer of the rotary cuvette type designed to use small disposable cuvette rotors is described in U.S. application Ser. No. 295,780, filed Oct. 6, 1972, and having a common assignee with the present application. The present invention was conceived to be utilized with such a device.

Enzyme analyses are frequently performed by means of rotary cuvette-type analytical photometers. This kind of analysis ideally requires that the temperature of the reacting solutions be controlled within less than one degree centigrade. For example, control of the reaction temperature within a few tenths of a degree can be more important than the selection of the reaction temperature itself, which might be typically chosen as 30°C, 32°C, or 37°C.

With the ordinary size analyzers it has not been possible to satisfactorily meet this temperature condition. Such an ordinary size analyzer is described in U.S. Pat. No. 3,555,284, issued to a common assignee on Jan. 12, 1971. The large mass of the rotor in such a prior device implies slow heat transfer within the rotor and various internal heater arrangements utilizing the principle of conductive transfer of heat have consistently resulted in slow thermal response. On the other hand, the miniature rotor of the compact photometer of the above-mentioned copending application due to its small size would make conduction heating with internal heaters very difficult if not impossible. Thus, there exists a need for efficiently heating the rotor of a small compact photometer and for accurately maintaining the temperature thereof at a desired operating temperature such that enzyme analyses can be efficiently conducted.

SUMMARY OF THE INVENTION

It is the object of the present invention to provide means, associated with the rotor of a compact analytical photometer of the rotary cuvette type, for sensing and regulating the temperature of the rotor to maintain it at a desired temperature during operation of said photometer.

The above object has been accomplished in the present invention by detecting the temperature in the vicinity of one of the rotor cuvettes and utilizing the output signal therefrom for controlling a heat lamp associated with the rotor for providing radiant heat thereto in accordance with a desired temperature level in a manner to be described hereinbelow.

BRIEF DESCRIPTION OF THE DRAWING

The single FIGURE in the drawing is a wiring diagram illustrating the temperature detector section and the temperature controller section of the present invention.

DESCRIPTION OF THE PREFERRED EMBODIMENT

The miniaturized photometer described in the above-mentioned copending application includes a small low-mass removable and disposable rotor primarily for the purpose of miniaturization and low cost. With plastic being a preferred construction material for such a rotor, the small rotors have been of sandwich construction wherein a black plastic disk having holes therethrough for defining the cuvettes is fixed between two clear plastic disks. The center disk is black in color so that the individual cuvette holes may be discerned. The temperature of the rotor is detected by a thermistor that is positioned in the rotor alignment pin very near one of the cuvettes, and the thermistor may be connected to a meter by means of a pair of slip rings in the same manner as described in the above-mentioned copending application. This temperature detection system has been combined with a temperature control circuit in the present invention such that the temperature of the rotor may be maintained at some desired temperature. Such a combined circuitry is illustrated in the single FIGURE in the drawing.

The temperature detector circuit consists of a thermistor 15 located in the photometer rotor housing, not shown, and a calibration potentiometer 17 connected in parallel between a current-to-voltage converter 18 and a SPDT switch 16 that is further connected to a 10V source. When the switch 16 is in its normal position (READ) the thermistor 15 is connected to the 10V source. In the other position (CAL), the switch 16 connects the potentiometer 17 to the 10V source. Since the resistance value of every thermistor will be slightly different at the chosen control temperature, a calibration curve for each thermistor must be obtained to establish the resistance value at the control temperature. The potentiometer 17 can be permanently set to this resistance value so that with the switch 16 in the CAL position the potentiometer simulates the thermistor at the control temperature.

The final element in the detector section is a voltage amplifier 19 that is connected to receive the output of the current-to-voltage converter 18. Components 18 and 19 (which can be a dual operational amplifier system) function to slightly amplify the current signal from the thermistor 15 and change it to a voltage signal. The current-to-voltage converter 18 includes a range (span) potentiometer 11, and the voltage amplifier 19 includes a zero suppression potentiometer 13 and an additional span control potentiometer 12. These features enable a 50 $\mu$A meter 20 to read full-scale a narrow temperature range of, for example, 28° to 32° centigrade. The meter 20 is connected to the amplifier 19 by way of a current limiting resistor 21 and a switch 27.

The output of the voltage amplifier 19, in addition to being connected to the meter 20, is also connected as one of two inputs to a comparator 22 in the temperature controller section of the present invention. The other input to the comparator 22 is a signal of opposite polarity which is obtained from a reference potentiometer 23 (TEMP ADJ). The reference potentiometer 23 is preset to exactly nullify the detected temperature signal when the thermistor 15 is at the desired control temperature. The setting of the potentiometer 23 is accomplished by turning the system on and adjusting the potentiometer until the desired cuvette temperature is obtained. A diode 24, a driver transistor 25, and a power transistor 26 comprise a power amplifier wherein any difference in the input voltages to the comparator 22 is amplified by a factor of 100 and a high current output is then provided that is used to power the radiant heat lamp 14 which is positioned adjacent to or in close proximity to the photometer rotor, not shown, to supply heat thereto until such time as the desired temperature is reached by the rotor as sensed by the thermistor 15.

There is thus provided a closed-loop radiant heat controller wherein radiant heat from the lamp 14 passes through a transparent rotor cover (not shown) and is rapidly absorbed by the black plastic of the rotor. The clear plastic of the rotor acts as an insulator to prevent heat loss, especially to the aluminum rotor holder, not shown. Even distribution of heat is assured by the rotation of the rotor under the radiant light source.

This invention has been described by way of illustration rather than limitation and it should be apparent that it is equally applicable in fields other than those described.

What is claimed is:

1. In a compact analytical photometer of the rotary cuvette type, a temperature detector and control system for maintaining the rotor of said photometer at a desired temperature comprising a thermistor mounted in said rotor near one of the cuvettes thereof, a positive voltage source connected to said thermistor, a current-to-voltage converter connected to the output of said thermistor, a voltage amplifier connected to the output of said converter, a meter connected to said amplifier for providing an indication of the temperature of said rotor, a comparator, a temperature adjustment reference potentiometer, the output of said voltage amplifier and output of said potentiometer connected in opposition to each other and as a combined input to said comparator, a radiant heat lamp positioned adjacent to said rotor for supplying heat thereto, and means connected between the output of said comparator and the input to said lamp for amplifying any output signal from said comparator for powering said lamp as long as there is any difference in the input voltages to said comparator, said reference potentiometer adapted to be preset to exactly nullify the detected temperature signal from said thermistor when said rotor is at said desired temperature, whereby said system automatically maintains said rotor at said desired temperature.

2. The system set forth in claim 1, and further including a calibration potentiometer connected in parallel with said thermistor between said positive voltage source and said converter, and a single-pole-double-throw switch for selectively connecting either said calibration potentiometer or said thermistor between said positive voltage source and said converter.

3. The method of maintaining the temperature of the rotor cuvettes in a rotary cuvette photometer at a desired value above ambient temperature comprising the steps of supplying radiant heat from a single source to a rotor containing said cuvettes, detecting the temperature adjacent one of said cuvettes, generating a first electrical signal proportional to said detected temperature, generating a second electrical signal proportional to the temperature desired to be maintained in said cuvettes, generating a third electrical signal proportional to any difference between said first and second signals, and controlling the radiant heat supplied to said rotor in accordance with said third signal to maintain said temperature at said desired value above the ambient temperature to which said photometer is exposed.

* * * * *